United States Patent [19]

Stönner et al.

[11] 4,025,423
[45] May 24, 1977

[54] PROCESS FOR REMOVING MONOHYDRIC AND POLYHYDRIC PHENOLS FROM WASTE WATER

[75] Inventors: Hans Martin Stönner, Schwalbach; Paul Wiesner, Oberursel, both of Germany

[73] Assignee: Metallgesellschaft Aktiengesellschaft, Frankfurt am Main, Germany

[22] Filed: Jan. 9, 1976

[21] Appl. No.: 647,968

[30] Foreign Application Priority Data

Jan. 15, 1975 Germany .......................... 2501376

[52] U.S. Cl. ............................ 210/21; 210/73 R; 260/627 H
[51] Int. Cl.² ........................................ B01D 11/04
[58] Field of Search .................. 210/21, 22, 73 R; 260/627 H, 627 R

[56] References Cited

UNITED STATES PATENTS

| | | | |
|---|---|---|---|
| 1,832,140 | 11/1931 | Shaw ........................... | 260/627 R |
| 2,445,825 | 7/1948 | Gollmar ....................... | 260/627 R |
| 2,675,412 | 4/1954 | Herbert et al. ............... | 260/627 R |
| 2,807,654 | 9/1957 | Grimmett et al. ............ | 210/21 X |
| 3,036,882 | 5/1962 | Bemmann et al. .......... | 260/627 R |
| 3,277,185 | 10/1966 | Eisenlohr et al. ............ | 260/627 R |
| 3,963,610 | 6/1976 | Hauschulz et al. .......... | 210/21 |

FOREIGN PATENTS OR APPLICATIONS

| | | | |
|---|---|---|---|
| 159,201 | 3/1952 | Australia ...................... | 210/21 |
| 335,155 | 9/1930 | United Kingdom .......... | 260/627 R |

*Primary Examiner*—Frank A. Spear, Jr.
*Assistant Examiner*—R. G. Mukai
*Attorney, Agent, or Firm*—Burgess, Dinklage & Sprung

[57] ABSTRACT

Monohydric and polyhydric phenols are removed from waste water together with hydrogen sulfide, free and combined ammonia, by extraction and distillation. The waste water is formed during the degasification or gasification of coal and is subsequently subjected to biological purification.

The steps of the process are as follows:
1. Removing a major portion of the monohydric phenol, part of the polyhydric phenol and any free fatty acids present in the waste water by extraction with a small amount of a non-saponifying organic solvent having a boiling point below 100° C;
2. Separating the phenols from the extract by distillation;
3. Removing a major portion of the polyhydric phenols, the remaining monohydric phenols and any free acids by a single or repeated extraction with a large amount of the same organic solvent from the refine phase from step (1).
4. Transforming the phenols in the extract from step (3) to their salts by treatment with an aqueous alkaline solution, washing the salts out and separating the mixture into an organic phase and an aqueous phase;
5. Recycling the solvent-containing organic phase from step (4) to step (3);
6. Recovering the free phenols from the aqueous phase from step (4) using surplus carbon dioxide; and
7. Separating the free phenols by decanting and/or extraction with the organic solvent or the sump product from step (2).

7 Claims, 1 Drawing Figure

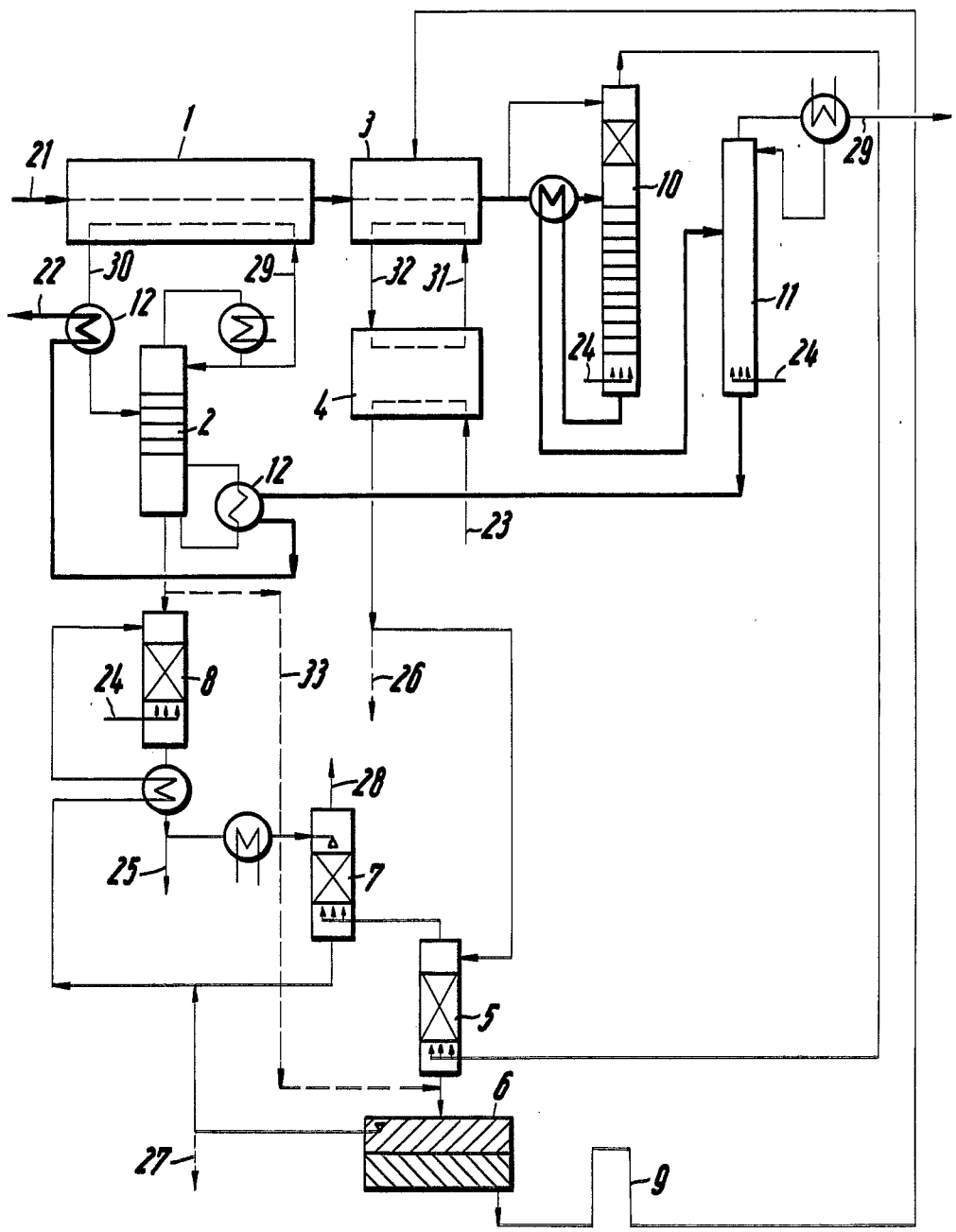

PROCESS FOR REMOVING MONOHYDRIC AND POLYHYDRIC PHENOLS FROM WASTE WATER

BACKGROUND

This invention relates to a process of removing monohydric, dihydric and polyhydric phenols, hydrogen sulfide, free and combined ammonia by extraction and distillation from waste water which is formed during the degasification or gasification of coal and is subsequently subjected to biological purification.

To remove phenol from ammonia-containing waste water (also referred to herein as sewage) formed in coking plants, low-temperature carbonization plants, gas-producing plants and the like it is known to thoroughly mix the sewage with a low-boiling, oxygen-containing, organic solvent, such as butylacetate. After the subsequent stratification, a major poriton of the phenols is contained in the solvent. When the process is repeated several times in counterflow operation, the phenol can be recovered in a yield of more that 99.9%. The organic solvent required to extract the phenol can be purified by distillation and re-used.

The dephenolized water may be subjected to a biological after-purification, possibly after a removal of ammonia (Lurgi-Handbuch, 1960, pages 64/65).

It is also known to use two solvent cycles in the dephenolization of industrial sewage. A major portion of phenol is removed in the first cycle and the remainder in the second. The solvent for the first cycle is removed from the laden solvent of the second cycle and the solvent which has been recovered by distillation from the first cycle is fed into the second cycle (German Pat. No. 939,268). This process can only be used, however, with two gas water streams which differ in the distribution of phenol and in rate.

Whereas the known treatments can be used to remove mainly monohydric phenols from industrial sewage, the processes become fairly expensive if the polyhydric phenols are to be extracted too. The above-mentioned processes can be used for a complete removal also of dihydric and other polyhydric phenols but this is highly expensive because solvent is required in more than ten times the quantity needed for monohydric phenols. The sewage from which phenol has been removed still contains larger or smaller quantities of fatty acids, cyanides, and other impurities, some of which can be biologically decomposed only with difficulty. It would not be economical to remove these constituents chemically. On the other hand, sewage must meet strict requirements as to purity, particularly when the sewage is to be used, e.g., as cooling water.

In case of a very high content of polyhydric phenols and fatty acids, the usual extraction of the monohydric phenols, e.g., with 10% isopropylether in ten stages, results in a dephenolized water which still contains a large proportion of these substances so that the loading of the subsequent biological purification is very high. In the latter, the formation and removal of sludge constitute a great problem.

SUMMARY

This invention avoids these and other disadvantages and to provide an economical process for removing monohydric and polyhydric phenols as well as acid components, such as $H_2S$ and also ammonia, from sewage formed during the degasification or gasification of coal, in such a manner that the resulting sewage is sufficiently pure for use as cooling water, possibly after an intervening biological treatment.

Also, this invention reduces the phenol content of the sewage to such a degree that a biological afterpurification is enabled without a dilution of the sewage.

This is accomplished according to the invention in that a. a major portion of the monohydric phenol and part of the polyhydric phenols and of any free fatty acids which are present are removed by an extraction with a small amount of a non-saponifying organic solvent having a boiling point below 100° C;

b. the phenols are separated from the extract by distillation;

c. a major portion of the polyhydric phenols and the remainder of the monophenols and of any free fatty acids are removed by a single or repeated extraction with a larger amount of the same organic solvent from the refined phase obtained in (a);

d. the phenols in the extraction obtained by (c) are transformed to their salts by a treatment with an aqueous alkaline solution and are washed out, and the mixture is separated into an organic phase and an aqueous phase;

e. the solvent-containing organic phase obtained in (d) is recycled to (c);

f. the free phenols are recovered by surplus $CO_2$ from the aqueous phase obtained in (d); and g. are separated by decanting and/or extraction with the organic solvent or the sump product obtained in (b).

DESCRIPTION

Di-isopropylether is preferably used as organic solvent.

The $CO_2$ required for the liberation of the phenols in step (f) of the process according to the invention is suitably recovered from the sewage by an atmospheric or superatmospheric de-acidification with simultaneous stripping of remaining solvent and $H_2S$.

The remaining $CO_2$ and $H_2S$ gases, which still contain solvents and traces of $NH_3$, are suitably scrubbed off with phenol.

From the scrubbing phenol, its admixtures, particularly the organic solvent, are desirably removed by being stripped off.

The decomposition of the phenolates in step (f) of the process according to the invention by a treatment with $CO_2$ results in the formation of alkali carbonate. According to a preferred feature of the invention, this alkali carbonate may be used to liberate the combined $NH_3$, and the thus liberated $NH_3$ may be stripped off together with the free $NH_3$ which is present.

According to a preferred feature of the invention, the free phenols liberated in (f) may be mixed with the scrubbing phenol, which contains solvent, and the admixture (solvent) may be removed from the mixture by being stripped off.

According to a preferred feature of the invention, the heat generated by the stripping of $NH_3$ is used to distill the solvent in (b).

In accordance with the invention, only so much solvent is used to step (a) for extraction as is formed under atmospheric pressure in the stripping of $NH_3$ by the heat exchange with the heat of the sewage. This will result in a saving of additional steam in (b).

The distribution factors of the polyhydric phenols and fatty acids are only a small fraction of those of the monohydric phenols.

The invention affords the advantage that the purification of the sewage greatly facilitates the subsequent biological purification.

Because a de-acidification (removal of $H_2S$ and $CO_2$) and a stripping on $NH_3$ are effected between the extraction and the biological purification, the invention affords the advantage that the waste heat of the sewage subjected to the stripping treatment is utilized. When a suitable low-boiling solvent is selected, a heat exchange between the sewage and the means for heating the solvent-distilling column can be carried out under atmospheric pressure. Solvent may be recycled at such a high rate that the sewage can be cooled close to the boiling point of the solvent. Additional steam is not required in this case, as is apparent from the following example:

The sump temperature of the $NH_3$ stripper is between 100° and 105° C. The solvent is, e.g., di-isopropyl ether having a boiling point of 68° C. In that case a solvent ratio of 30-40%, related to sewage, may be used so that additional steam for recycling the solvent is not required if the heat exchanger is properly controlled. The increase of the recycled solvent rate from normally 10% to 30-40% results in an increase of the yield of polyhydric phenols from about 30% to about 80%, so that the loading of the subsequent biological purification is much reduced. It has also been found that with or without an increase of the solvent recycle rate the content of polyhydric phenols may be further decreased without an increase of the consumption of steam or chemicals.

When monohydric phenols and part of the polyhydric phenols and of any free fatty acids present have been extracted from the sewage and recovered from the extract by distillation, the sewage is subjected to a further extraction in one to five stages, in which the same solvent is used, so that the dissolved solvents can be jointly recovered from the sewage, and in which the solvent is used at a rate which is sufficiently high for removing a major portion, e.g., 80-99.9% of the polyhydric phenols and of any free fatty acids present.

The resulting extract contains a relatively small quantity of polyhydric phenols and possibly free fatty acids in a large quantity of solvent, e.g., 100%, related to the sewage.

Because a major portion of the total quantity of phenols has previously been removed by physical processes (extraction and distillation), this small remainder can be economically removed from the solvent by washing with an alkaline solution, e.g., in that NaOH is added. After the washing with the alkaline solution, the solvent is recycled through the after-extracting stage or stages.

The mixture of polyhydric phenols and fatty acids is now present in the form of alkaline compounds and may either be directly removed from the plant after a recovery of solvent or may be treated further in another step of the process according to the invention.

For this reason, the process is combined with the above-mentioned de-acidification.

The $CO_2$-containing gases escaping from the deacidifying means are used to liberate the mixture of polyhydric phenols and fatty acids from the alkaline compounds (carbonization). The quantitative proportions are always controlled to provide for a sufficiently large surplus of $CO_2$ for the decomposition. The liberated mixture of polyhydric phenols and any fatty acids is separated and is either discharged directly or admixed to the raw phenol obtained in the first extraction step. In the latter case, the small quantity of remaining solvent will also be recovered from the mixture if the latter is admixed to the raw phenol before the stripping column.

In another step according to the invention, the sodium carbonate formed from $CO_2$ and the alkali must be admixed to the sewage after the first extraction step (a) but before the stripping of $NH_3$. As a result, the fixed salts of $NH_3$ contained in the sewage are decomposed so that they can be removed in the $NH_3$ stripper. All alkali (e.g., NaOH) which is in any way required to decompose the fixed $NH_3$ is desirably used before to wash the extract obtained in the second extracting step (c). The surplus will then be utilized in any case to decompose the combined $NH_3$.

The sodium carbonate phase which contains remaining solvent and remaining phenol is suitably admixed to the sewage at a point at which the phenol and the solvent can be recovered, e.g., in the process according to the invention at a suitable point of the first or second extraction step (a) or (c).

The process according to the invention is shown diagrammatically and by way of example on the drawing and will be described more fully hereinafter:

In the drawing, 1 designates the first extraction step (a) (mainly monohydric phenols); 2 the distillation (b) of the first extract, with or without a heat exchange with the $NH_3$ column; 3 the second extraction step (c) (polyhydric phenols); 4 the washing of the second extract with NaOH solution (d); 5 the decomposition of the phenol (f) by a treatment with $CO_2$-containing gases from the superatmospheric de-acidification; 6 the separation (g) of the mixture which contains polyhydric phenols (with or without the supply of sump products of columns 2 or 8); 7 the scrubbing of the gases with recycled phenol; 8 the joint recovery of solvent from scrubbing phenol and raw phenol and mixture of polyhydric phenols in a stripping column with stripping steam; 9 the feeding of the separated sodium carbonate solution (which contains phenol and solvent) to a point of the first or second extraction step (a) or (c) for the recovery of the dissolved phenol from 6 and the decomposition of the fixed $NH_3$ in 1 to 3; 10 the stripping of solvent, $CO_2$, $H_2S$ under superatmospheric (or atmospheric) pressure from the sewage; 11 the stripping of all $NH_3$ as well as the still remaining $H_2S$ and $CO_2$; 12 the heat exchange with stripped $NH_3$-water; 21 the phenol-containing sewage (feed); 22 the dephenolized water (effluent); 23 the NaOH solution (feed); 24 the steam (feed); 25 the raw phenol mixture (effluent); 26 the sodium phenolate solution (alternative effluent); 27 the liberated phenol (alternative effluent); 28 acid gases scrubbed with phenol (effluent); 29 the small solvent flow (cycle a); 30 the small extract flow (cycle a); 31 the large solvent flow (cycle c); 32 the large extract flow (cycle c); 33 the solvent-containing sump product from (2) (alternatively passed through 6).

EXAMPLE $10^6$ kg sewage from the pressure gasification of recent hard coal containing, inter alia 56 kmoles monohydric phenols
20 kmoles dihydric phenols
27 kmoles fatty acids
40 kmoles fixed $NH_3$ 196 kmoles $CO_2$ In this case, 40 kmoles NaOh are required to decompose the combined $NH_3$.

A mixture of 40 kmoles NaOH ($2 \times 20 = 40$) is then required to wash the dihydric phenols and the fatty acids. Because part of the polyhydric phenols (about 30% or more) are already extracted in the first extraction step (a), the quantity of 40 kmoles NaOH is more than sufficient in any case for washing the polyhydric phenols from the extract obtained in the second extraction step (c). 110 kmoles of $CO_2$ are stripped off by the superatmospheric de-acidification. This quantity is a multiple of what is required to decompose the sodium phenolate.

It has thus been proved that chemicals are not required in the process according to the invention in addition to the quantity which is in any way required to decompose the fixed $NH_3$.

The $CO_2$-containing gases used to decompose the phenolate contain still mrmaining solvent and traces of $NH_3$. These are jointly scrubbed fom the gas by a treatment with cooled and recycled phenol.

What is claimed is:

1. Process for removing monohydric and polyhydric phenols, hydrogen sulfide, free and combined ammonia by extraction and distillation from waste water formed during the degasification or gasification of coal and subsequently subjected to biological purification, which process comprises:
   a. removing a major portion of the monohydric phenol, part of the polyhydric phenols and a portion of any of the free fatty acids present in the waste water by extraction with a small amount of a non-saponifying organic solvent having a boiling point below 100° C, thereby forming a first extract phase and a first refined phase;
   b. separating the phenols from said first extract phase by distillation whereby said organic solvent is distilled off;
   removing a major portion of the polyhydric phenols the remainder of the monophenols and an additional amount of any free fatty acids which may be present by a single or repeated extraction with a larger amount of the same organic solvent employed in step (a) from said first refined phase obtained from step (a), thereby forming a second extraction phase and a second refined phase;
   d. separating said second extraction phase from said second refined phase and transforming the phenols in said second extraction phase obtained from step (c) to their salts by treating with an aqueous alkaline solution and separating the so-treated mixture into an organic phase and an aqueous phase;
   e. recycling the solvent-containing organic phase from step (d) to step (c);
   f. recovering the free phenols from the aqueous phase from step (d) by contacting the same with an amount of $CO_2$ obtained by atmospheric or superatmospheric deacidification of said second refined phase with simultaneous stripping of the remaining solvent and $H_2S$, thereby forming an alkali carbonate;
   g. separating the free phenols from said alkali carbonate;
   h. contacting said first refined phase with said alkali carbonate to liberate $NH_3$; and
   i. jointly stripping off said liberated $NH_3$ with any $NH_3$ with 2. Process of claim 1 wherein di-isopropylettner is used as organic solvent.

3. Process of claim 1 wherein the remaining $CO_2$ and $H_2S$ gases, which still contain solvent and traces of $NH_3$, following said treatment of the aqueous phase containing phenol with $CO_2$ in step (f), are scrubbed with phenol.

4. A process according to claim 3 wherein organic solvent is recovered following said scrubbing from a stream containing phenol employed for said scrubbing, $CO_2$, $H_2S$ and organic solvent by adding to said stream phenol separated in stem (g) and stripping the resultant admixture.

5. A process according to claim 1 wherein the free phenol is separated in step (g) by decantation.

6. A process according to claim 1 wherein the free phenol obtained in step (g) is separated by extraction with organic solvent or the sump product obtained from step (b).

7. Process of claim 1 wherein the heat generated by the stripping of $NH_3$ in step (i) is used to distill off the solvent in (b) and wherein the solvent required for the extraction in step (a) is used at the rate at which the solvent can be distilled under atmospheric pressure by a heat exchange with the heat generated by the stripping of $NH_3$ in step (i).

* * * * *